United States Patent
Betts et al.

(10) Patent No.: US 6,853,162 B2
(45) Date of Patent: Feb. 8, 2005

(54) RE-ZEROING OF A STEPPER MOTOR WITHOUT NOISE OR MOVEMENT

(75) Inventors: Stephen L. Betts, Canton, MI (US); Ronald P. Russ, Farmington Hills, MI (US); Charles F. Weber, South Lyon, MI (US); Douglas Hughson, White Lake, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 45 days.

(21) Appl. No.: 10/310,370

(22) Filed: Dec. 5, 2002

(65) Prior Publication Data

US 2004/0108829 A1 Jun. 10, 2004

(51) Int. Cl.$^7$ .............................. G01R 5/00; H02P 8/32
(52) U.S. Cl. ...................................... 318/696; 116/284
(58) Field of Search ................................. 318/685, 696; 116/46, 47, 284–288, 297; 324/154 R, 154 PB

(56) References Cited

U.S. PATENT DOCUMENTS

| | | | |
|---|---|---|---|
| 3,637,299 A | * 1/1972 | Butler et al. | .................. 352/85 |
| 4,087,732 A | * 5/1978 | Pritchard | .................... 318/696 |
| 4,125,801 A | 11/1978 | Leenhouts | |
| 4,475,082 A | * 10/1984 | Lindig | ........................ 324/160 |
| 4,567,434 A | 1/1986 | Lindig | |
| 4,706,008 A | 11/1987 | Cronch et al. | |
| 5,059,916 A | * 10/1991 | Johnson | ...................... 324/713 |
| 5,287,050 A | * 2/1994 | Kronenberg et al. | ........ 318/696 |
| 5,309,087 A | * 5/1994 | Markow et al. | ............ 324/146 |
| 5,783,939 A | * 7/1998 | Lippmann et al. | ...... 324/154 R |
| 5,814,964 A | 9/1998 | Kimura | |
| 5,847,531 A | * 12/1998 | Hoffsommer et al. | ....... 318/696 |
| 5,866,998 A | 2/1999 | Menegoli | |
| 5,877,694 A | * 3/1999 | Kataoka | ..................... 340/688 |
| 5,909,096 A | 6/1999 | Detais | |
| 6,208,107 B1 | 3/2001 | Maske et al. | |
| 6,249,300 B1 | * 6/2001 | Kerr et al. | ................... 347/198 |
| 6,519,999 B2 | * 2/2003 | Komura et al. | .............. 73/1.88 |
| 6,731,092 B2 | * 5/2004 | Shimazaki | .................. 318/685 |

* cited by examiner

Primary Examiner—Bentsu Ro
(74) Attorney, Agent, or Firm—Dickinson Wright PLLC

(57) ABSTRACT

The present invention comprises a method and apparatus for driving and homing a stepper motor. In a preferred embodiment, 24 micro step pulse width modulated (PWM) voltage signals are used to drive the coils of the stepper motor. The phases between the driving signals are 90° out of phase. Thus, a sine/cosine methodology is used to drive the motor. Using micro-programmable pulse width modulation (PWM) levels involves the microprocessor reading stored voltage levels from a table stored in memory which corresponds to the amount of angular displacement desired by the motor. These voltage levels are then applied to the motor's coils. The microprocessor performs these operations by executing software instructions stored in memory. The software can be stored in memory located in the controller or in a separate logic block or logic chip. The magnitude of the bounce of a pointer attached to the output shaft of the motor and the magnitude of the noise generated as the pointer contacts a mechanical stop, are both directly related to the applied voltage and speed or frequency of the homing strategy. To reduce the bounce of the pointer and the generated noise to barely discernable levels, the applied voltage is reduced to between 15% and 30% of the normal driving voltage (approximately 1 volt for a 5 volt system). Additionally, the speed of homing is set to a value below the new start-stop frequency of the motor.

22 Claims, 10 Drawing Sheets

RE-ZEROING OF A STEPPER MOTOR WITHOUT NOISE OR MOVEMENT

BACKGROUND OF THE INVENTION

The present invention relates to the use of a stepper motor as a relative position device. The name stepper motors comes from the fact that the motors move in discrete steps. This feature makes stepper motors ideally suited for many different types of positioning applications. In the prior art, stepper motors employed as relative positioning devices used a back emf feedback in an electronic closed loop system. However, this method requires the use of additional hardware or special micros, either of which can be unacceptably expensive. Currently, there are three main categories of stepper motors found in the prior art, permanent magnet, variable reluctance and hybrid.

SUMMARY OF THE INVENTION

The invention comprises a method of driving a stepper motor, comprising the steps of driving the stepper motor using micro steps and homing the stepper motor.

In another embodiment, the stepper motor uses a sine/cosine method to drive the stepper motor in micro steps.

In yet another embodiment, the step of homing comprises reducing an applied voltage and reducing a frequency of the motor below a start-stop frequency of the motor.

In still another embodiment, the invention comprises a stepper motor, comprising a plurality of windings and a controller comprising a plurality of outputs operably attached to the windings. The controller comprises a processor, pulse width modulation drivers operably connected to the processor, and memory comprising software operably connected to the processor.

In still another embodiment, the memory comprises a table stored in the memory, whereby the table comprises driving signals which are 90° out of phase with each other corresponding to states also stored in the table.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
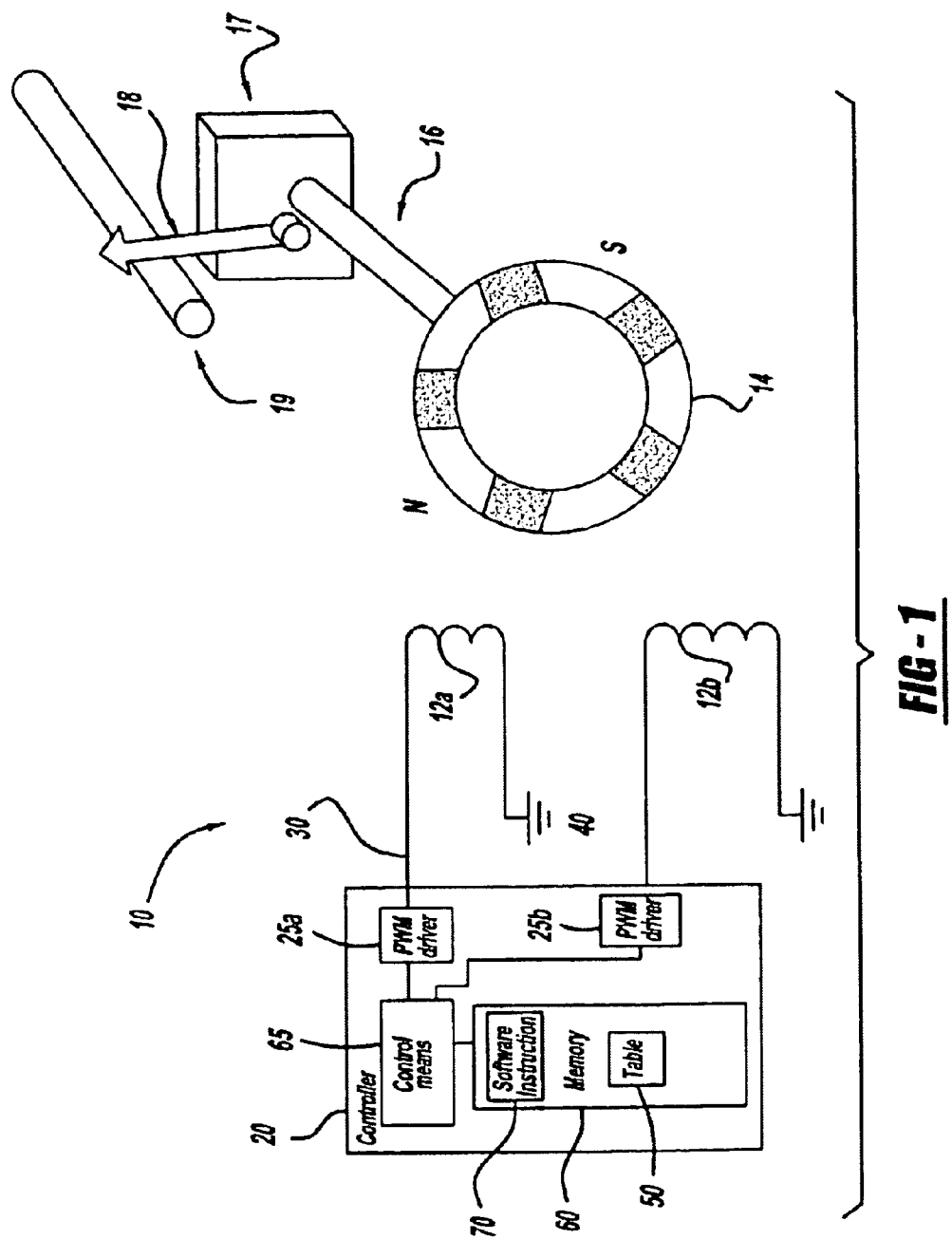
FIG. 1 is a circuit diagram illustrating the invention.

When used as relative position devices, stepper motors require being reset or initialized in order to ensure accurate positioning when there is no closed loop feedback present. Initialization of a stepper motor can be done in one of two ways. The first way involves driving the motor back a number of steps that exceeds the anticipated distance the motor is above its mechanical reference. For example, a stepper motor can be coupled to a gear wheel which rotates in the same direction as the stepper motor. A pointer is attached to the gear wheel. The pointer can take the form of a rod. A fixed stop pin can be positioned in the vicinity of the gear wheel so as to make contact with the pointer when the pointer has rotated a certain amount and prevent the pointer from rotating any further. Consequently, the gear wheel and the stepper motor are also prevented from rotating any further. The stop pin is used to limit deflection of the motor in both the zero and the full position.

During an event where homing or zeroing may occur, such as ignition key-off, or shutting a vehicle off, the interruption of the voltage by the ignition lock is detected. Next, the motor's control circuitry sends a reset command to the motor's coils. This command can take the form of a constant number of pulses, the number of which are great enough to reset the pointer to zero no matter what position the pointer is at. The pointer won't rotate past the stop pin.

The second method involves adding electronic feedback to the system to provide positional information about the motor.

The first method of positioning is usually preferred because the second method is expensive and requires more microprocessor bandwidth than the first method. However, driving the motor into a hard stop may generate two undesired effects, noise and/or bounce. The noise is caused by the fact that the stepping motor rotor remains driven after the pointer comes in contact with the stop and the pointer will continually come in contact with the mechanical stop and produce noise until all the reset pulses have been delivered.

The "jumping" or "bounce" is caused by the pointer bouncing off of the stop as the rotor re-synchronizes with the magnetic field in the coils of the motor. The levels of both the noise and bounce can prove to be unacceptable and, as a result, prevent the use of stepper motors as an indicator device without significant added costs incurred to reduce the noise and bounce.

By reducing applied voltages when executing homing (also known as zeroing or resetting), and by sending step pulses at a frequency (speed) below the start/stop frequency of the motor for the resulting power, it is possible to significantly reduce or eliminate both the noise and bounce typically associated with this operation.

Unlike an air gauge where applying specific discrete voltages to its coils controls the absolute position of the device, stepper motor positioning is done by sending a number pulses corresponding to a relative displacement or deflection. Accurate positioning of a stepper motor requires implementation of a homing strategy that utilizes a mechanical reference point at the end of the motor travel.

Mechanical Stop Selection

Using mechanical stop selection, homing or zeroing the stepper motor is performed by driving the motor in a descending direction until the movement of the motor is blocked by a mechanical stop or interference. There are three types of mechanical interferences used with stepper motors.

1) External/Dial: Pin located on the applique, towards the tip of the pointer.

2) External/Hub: Pin located under the hub of the pointer, and relief in the dial/applique.

3) Internal/Motor: Pin located on the output gear of the stepper motor and a tab in the motor housing.

Figure 2:
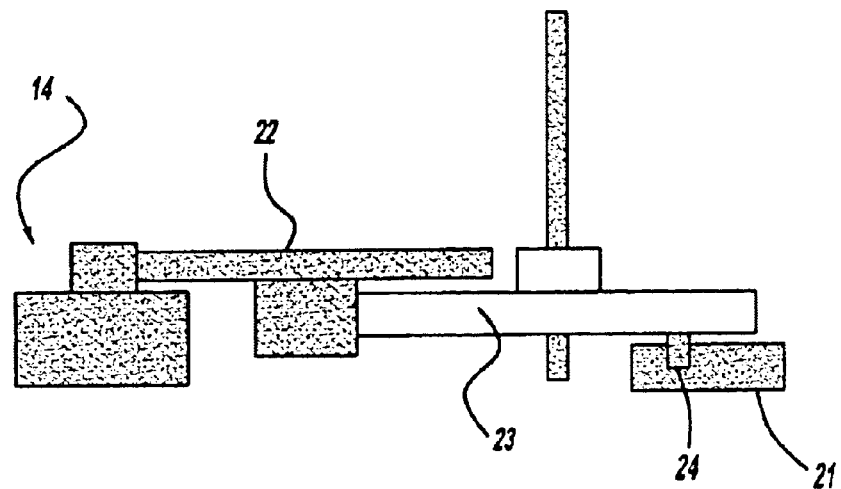
FIG. 2 illustrates an internal motor stop.

The present invention can use either 1) an external stop (see FIG. 1), or 3) an internal motor stop (see FIG. 2).

Each form of stop offers different characteristics and requires different processes.

| Charac-teristic | External/Dial | External/Hub | Internal/Motor |
|---|---|---|---|
| Visibility | Visible | Not Visible | Not Visible |
| Accuracy | Very accurate (<+/−1°) | Inaccurate (+/−6°) | Inaccurate (dependent upon pointer placement, +/−5°) |
| Pointer Movement | Medium | High | High |
| Hub Movement | High | Medium | Medium |
| Noise | High | Medium | None |
| Homing repeatability (without calibration) | Potential random error in some motors/gauges (10%) due to mechanical stop and rotor orientation. | Potential random error in some motors/gauges (10%) due to mechanical stop and rotor orientation. | Potential random error in some motors/gauges (10%) due to mechanical stop and rotor orientation. |

Homing Feature Functional Descriptions

There are three homing or zeroing methods used with stepper motors.

These methods include:

1) Open Loop: In this method, the drive motor descends towards the mechanical stop for a fixed number of steps at a controlled speed profile. It stops at a fixed step position. This is known as the motor home offset state.

2) On Board Back EMF: In this method, the drive motor descends towards the mechanical stop by full steps. It senses the back emf generated in the non-energized coil and stops when the back emf reaches a threshold voltage level, typically a few millivolts. It then will determine the step/position of the motor when the motor pointer has reached this stop. This step/position will act as a zero reference point when driving the motor in the positive direction. Using this method, one can also use the back EMF generated when the magnet flips back to realign with the driving field as a zero reference point.

3) Off Board Back EMF Calibration, Open Loop: This method uses a test circuit to sense back EMF that is generated when the motor is driven toward a mechanical stop. This stop position (i.e., the number of steps taken to reach this stop position) is stored in the stepper motor's memory. The drive motor descends towards the mechanical stop moving a fixed number of steps at a controlled speed until it stops at a preprogrammed step position.

Each homing method has different characteristics.

| Charac-teristic | Open Loop | On Board Back EMF | Off Board Back EMF |
|---|---|---|---|
| Additional Hardware (circuit) | None. | Onboard product. Circuit used to measure and analyze back emf pulse. | Calibration test equipment circuit used to measure and analyze back emf from coils. |
| Software | Normal drive (micro step) in reverse direction stopping at the step position defined in the micro memory (default position 0). Requires direct control over motor. | Half step mode for homing. Uses comparator for fast homing and A/D port slope analysis for slow homing. Determines when rotor is not turning. | Uses comparator to determine when rotor flips in reverse direction. |
| Tapping/Noise[1] | Present during overdrive into stop after initial contact with stop, until fixed number of steps are completed. Depends upon speed. Higher speed = lower noise. | None. Motor stops after initial contact with stop. | Present during overdrive into stop after initial contact with stop, until fixed number of steps are completed. Depends upon speed. Higher speed = lower noise. |
| Bounce against stop[2] | Magnitude of bounce depends on speed of pointer. (Higher speeds = higher bounce). | Bounce occurs for fast homing if motor/pointer is initially close to stop. | Magnitude of bounce depends on speed of pointer (Higher speeds = higher bounce). |
| Homing repeatability (accuracy) | Potential random error in some motors/gauges (10%) due to mechanical stop and rotor orientation without calibration. | Dynamic, position is updated with every homing and may change with expansion/contraction of plastics. | Is repeatable within a few micro steps (+/−3). High confidence. |
| Normal operation accuracy | Potential random error due to homing repeatability. | Accuracy unknown but can be much better than error. | Accuracy unknown but can be much better than error. |

[1]The taping noise referred to here is caused by repeated pointer contact with the mechanical stop and does not refer to gear noise of the motor.
[2]Bounce is referring to the observed movement of the tip of the pointer during homing operation.

Figure 3E:
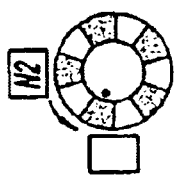
FIGS. 3–3e illustrates the effects of driving the motor counter clockwise in step mode.
Figure 3D:
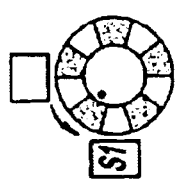
Figure 3C:
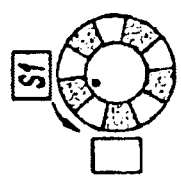
Figure 3B:
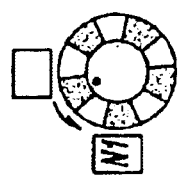
Figure 3A:
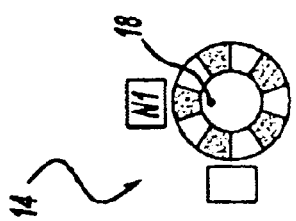
Figure 3:
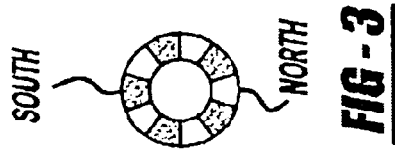

Open Loop Homing Strategy, Detailed Explanation:

In a preferred embodiment, an open loop homing strategy is used. With the introduction of computers, and programmable controllers came the ability to control motors using electronics. The motor will convert electrical pulses from the controller into discrete angular steps of the output shaft. For each electrical pulse, the rotor turns a number of degrees which depends on its design. FIG. 3 demonstrates the effects of driving the motor counter clockwise in step mode.

A motor can also be driven using some level of micro step mode. Micro is used here to mean a fraction of a full step. It effectively divides adjacent step positions into a plurality of steps.

In the preferred embodiment, stepping the motor in micro steps is achieved by applying various potentials to the two motor coils in a sine/cosine methodology as opposed to an on-off methodology. In a sine/cosine methodology, the phases between the two driving signals driving the two motor coils are 90° out of phase. In a preferred embodiment (see FIG. 1), the motor 10 is directly driven by a controller 20 which applies a voltage of approximately 5 volts to each stator coil. The motor comprises two coils, or windings or stators, 12a and 12b and a ten-pole rotor 14. The ten-pole rotor 14 is attached to a shaft 16 which is connected to a gear assembly 17. By means of shaft 16 and gear assembly 17, the pointer 18 is rotated as the rotor 14 rotates. The mechanical stop 19 prevents the pointer 18 from moving any further.

At some point during the homing of the motor 10, the output gear 17 of the stepper motor will stop turning either due to the attached pointer's 18 contact with an external pointer stop 19, or the gear pin 18 contact with the internal stop 19. When the output gear 17 is stopped from turning any further clockwise, the rotor 14 gear/magnet will be stopped from turning as well.

Because this is not a closed loop system, there is no way of determining when the output gear 17 has stopped turning. To insure that the pointer 18 has reached the pointer stop 19 and thus correct for any lost steps, the controller 20 will continue to cycle through the states 45a. States 45a represent discrete angular steps or displacements of the motor 10.

Figure 4E:
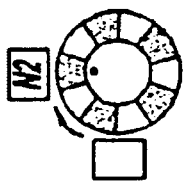
FIGS. 4–4e illustrates the motor rotor cycling through states, while against the stop.
Figure 4D:
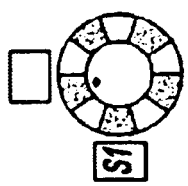
Figure 4C:
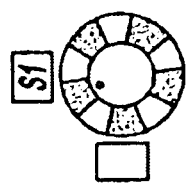
Figure 4B:
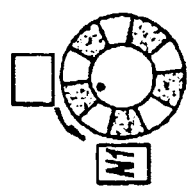
Figure 4A:
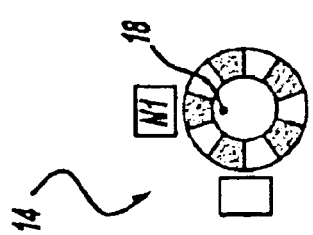
Figure 4:
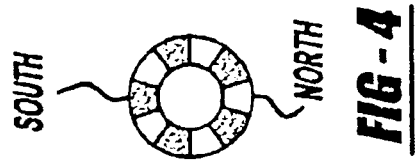

If the pointer 18 or output gear 17 were to contact the stop 19 when the rotor 14 was in the position shown in FIG. 3, step "b", the rotor 14 and thus the output gear/pointer 19 would "jump" back to the position shown in step "a" when the driver reached step "e". This is demonstrated in FIG. 4. In FIGS. 3 and 4, the blank rectangles=no field. The N by a square represents the north field, while the S by a square represents a south field. The number with the N or S is the sequential occurrence of the field (N1, S1, N2, S2 . . . ) as it goes from coil 1 to coil 2. The dot is just a fixed reference on the rotor magnet.

As the motor driver or controller 20 continues to cycle through the states 45a, the rotor 14 and output gear 17 and pointer 18 would continue to sweep into the pointer stop 19 and jump (or bounce) back to the position shown in step "a".

FIG. 2 illustrates an embodiment of the present invention in which an internal motor stop 21 is used. The gear assembly 17 is comprised of an intermediate gear 22 and an output gear 23. A gear pin 22 is mounted on the output gear 17b. By means of the intermediate gear 22 and the output gear 23, the pin 24 is rotated as the rotor 14 rotates. The internal motor stop 21 prevents the pin 24 from moving any further.

Figure 5:
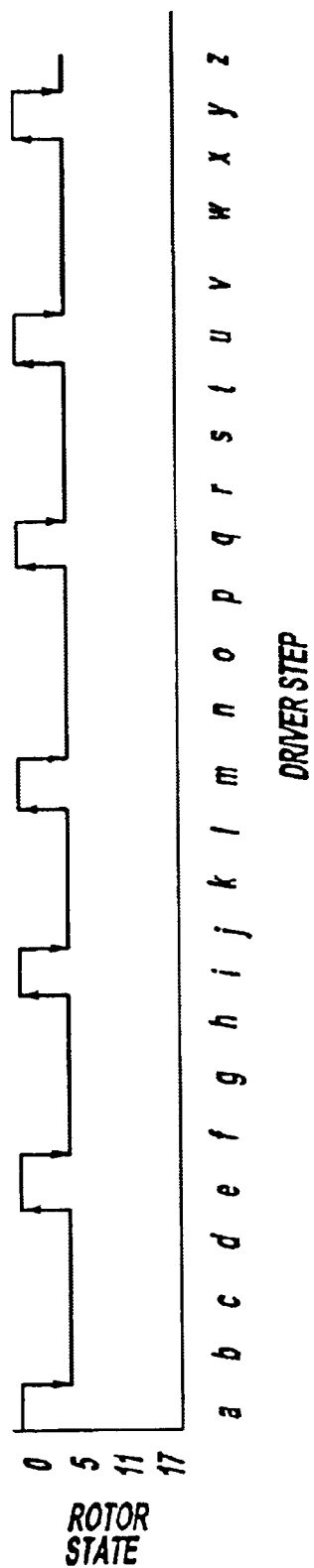
FIG. 5 illustrates the movement of the pointer and the bounce of the pointer.

In FIG. 5, each downward arrow represents the movement of the pointer 18 or output gear into the stop 19. In the case of the external pointer stops, this is the source of the "tapping" noise. Each upward arrow represents the "jumping" or "bounce" of the output gear 17 or pointer 18 off of the stop as the rotor re-synchronizes with the magnetic field in the stator coils 12a, 12b of the motor 10. The speed at which the motor 10 is driven during the homing process affects the magnitude of the noise generated and the amount of bounce.

Stepper Motor Homing Strategy

The implementation of a homing strategy for stepper motor 10 applications is used to insure that the motor 10 is starting from a "known" reference. (However, nothing is actually known since there is no closed loop feedback). Battery connect, ignition key-on and ignition key-off are events where homing may occur.

Figure 6:
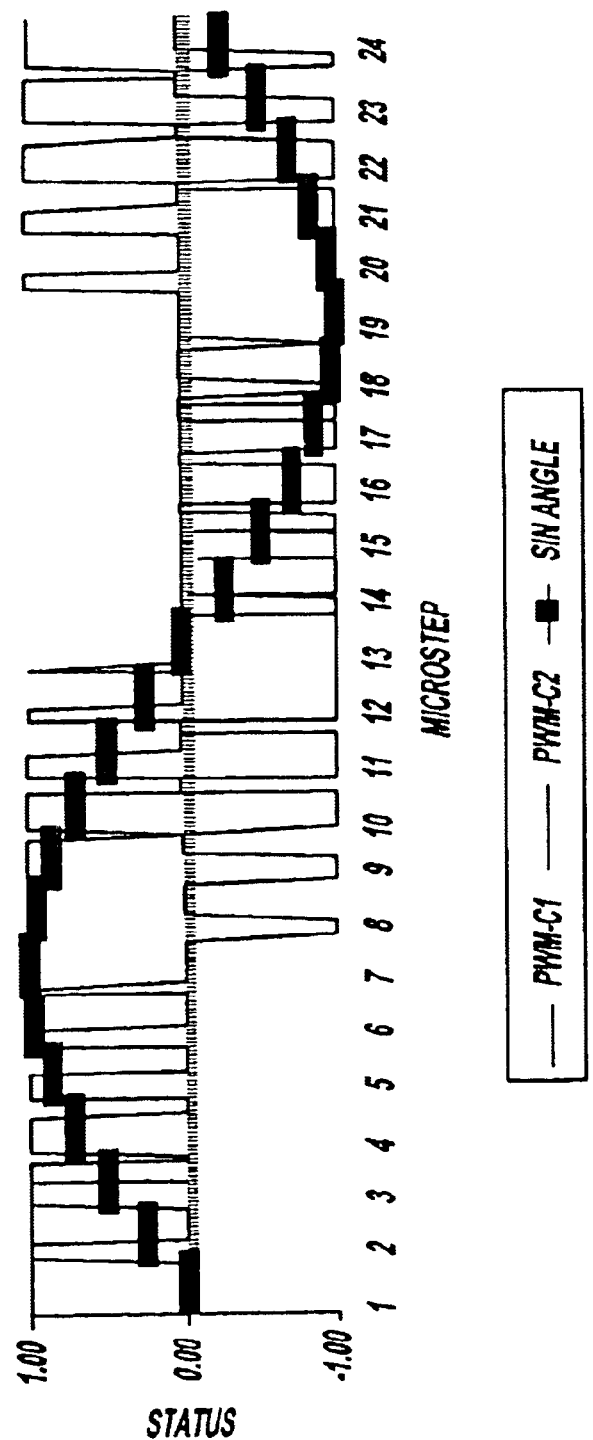
FIG. 6 illustrates a 24 micro step pulse width modulated voltage signal used to drive a stepper motor.

FIG. 6 depicts a 24 micro step (uStep) pulse width modulated (PWM) voltage signal used to drive a stepper motor 10. In a preferred embodiment, the controller 20 comprises two pulse width modulation drivers 25a, b to generate the driving signals (see FIG. 1). In FIG. 6, the voltages are stepping from −100% up to +100% of the peak voltage (typically 5 volts for a micro driven stepper motor). The phases between the two driving signals, (PWM-C1) 30 and (PWM-C2) 40, are shown as being 90° out of phase. Thus the control signal (PWM-C1) 30 driving coil 12a is 90° out of phase with the control signal (PWM-C2) 40 driving coil 12b. However, the actual phase shift is dependent upon the motor design.

For bi-directional operation of the motor 10, it is necessary to use a bipolar drive. The positive pulses drive the motor 10 in a clockwise (CW) direction, while the negative pulses drive the motor 10 in a counter-clockwise (CCW) direction. The duration of the pulse will affect the total amount of energy delivered to the motor 10, thereby affecting the number of degrees that it rotates.

Figure 7:
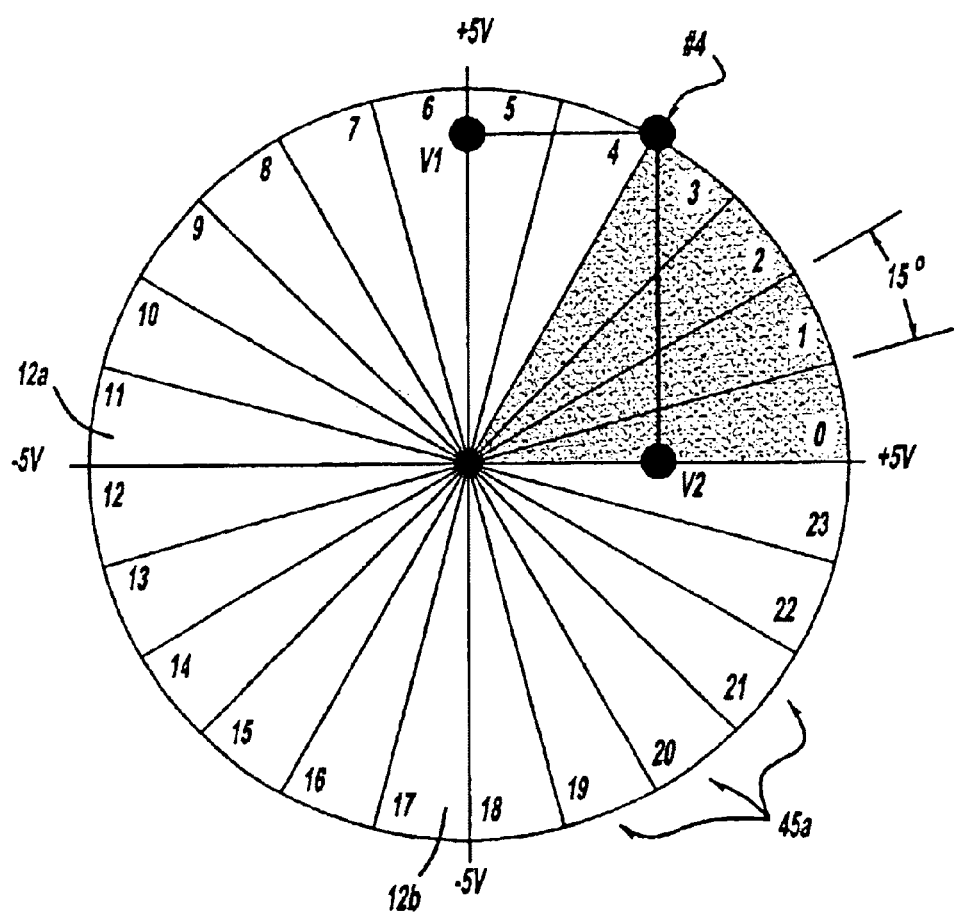
FIG. 7 illustrates the possible motor states used to determine the individual steps of the applied voltages, for 24 states.
Figure 8:
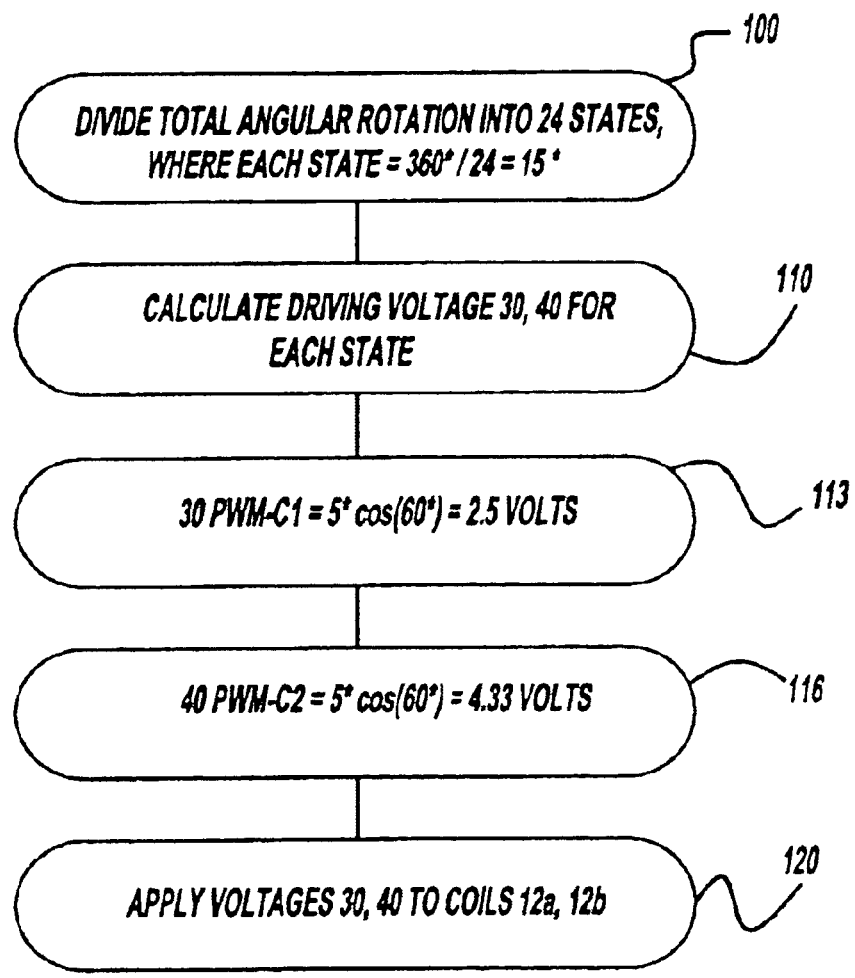
FIG. 8 is a flowchart illustrating how the driving voltages for each state 45 is calculated.

FIG. 7 illustrates how the possible motor states used to calculate the individual steps of the applied voltages are determined. There is a total angular rotation of 360° which is divided into states 45a. FIG. 8 is a flowchart illustrating how the driving voltages for each state 45 is calculated. In this example, there are 24 states 45a or micro steps. Thus, each state 45a corresponds to an angular step of 360/24=15° (100). Next, calculate the driving voltages 30, 40 for each state 45a (110). For example, at motor state #4 (which corresponds to an angular displacement or deflection of 4*15°=60°), the voltage 30 driving coil 12a, PWM-C1, is 5* cos (60°)=2.5 Volts (113). The voltage 40 driving coil 12b, PWM-C2, is 5 * sin (60°)=4.33 Volts (116). Thus, when these voltages 30, 40 are applied to coils 12a and 12b of the stepper motor 10, the rotor 14 will deflect 60° from zero (120). The following table 50 lists voltage driving values for coils 12a and 12b for each of the 24 states or angular deflections 45a. This table 50 can be stored in memory 60. It can be stored in RAM memory or ROM memory, or in any of the different forms of memory accessible by a controller 20. The controller 20 also comprises a processor, a microprocessor or any other form of processing or control means 65 operably connected to the pulse width modulation drivers 25a,b and the memory 60. The memory 60 can be part of the microprocessor 65 or in a separate logic block or logic chip. The memory 60 an also be located on the same chip as the controller 20.

TABLE 50

| Motor State 45a | Degrees | 30 PWM-C1 = 5 cos(#) (Volts) | 40 PWM-C2 = 5 sin (#) (Volts) |
|---|---|---|---|
| 0 | 0 | 5 | 0 |
| 1 | 15 | 4.83 | 1.29 |
| 2 | 30 | 4.33 | 2.50 |
| 3 | 45 | 3.54 | 3.54 |
| 4 | 60 | 2.50 | 4.33 |
| 5 | 75 | 1.29 | 4.83 |
| 6 | 90 | 0 | 5 |
| 7 | 105 | −1.29 | 4.83 |
| 8 | 120 | −2.50 | 4.33 |
| 9 | 135 | −3.54 | 3.54 |
| 10 | 150 | −4.33 | 2.50 |
| 11 | 165 | −4.83 | 1.29 |
| 12 | 180 | −5 | 0 |
| 13 | 195 | −4.83 | −1.29 |
| 14 | 210 | −4.33 | −2.50 |
| 15 | 225 | −3.54 | −3.54 |
| 16 | 240 | −2.50 | −4.33 |
| 17 | 255 | −1.29 | −4.83 |
| 18 | 270 | 0 | −5 |
| 19 | 285 | 1.29 | −4.83 |

TABLE 50-continued

| Motor State 45a | Degrees | 30 PWM-C1 = 5 cos(#) (Volts) | 40 PWM-C2 = 5 sin (#) (Volts) |
|---|---|---|---|
| 20 | 300 | 2.5 | −4.33 |
| 21 | 315 | 3.54 | −3.54 |
| 22 | 330 | 4.33 | −2.50 |
| 23 | 345 | 4.83 | −1.29 |

Driving the stepper motor 10 with these voltage levels produces the maximum motor torque for any given speed, which in one embodiment ranges from 1–2 milli-Neuton meter (mNm) between 300°/sec and 100°/sec). As mentioned earlier, the magnitude of the bounce of the pointer 18 attached to the output shaft 16 of the motor 10 and the magnitude of the noise generated as the pointer 18 contacts the mechanical stop 19, are both directly related to the applied voltage and speed or frequency of the homing strategy.

Figure 9:
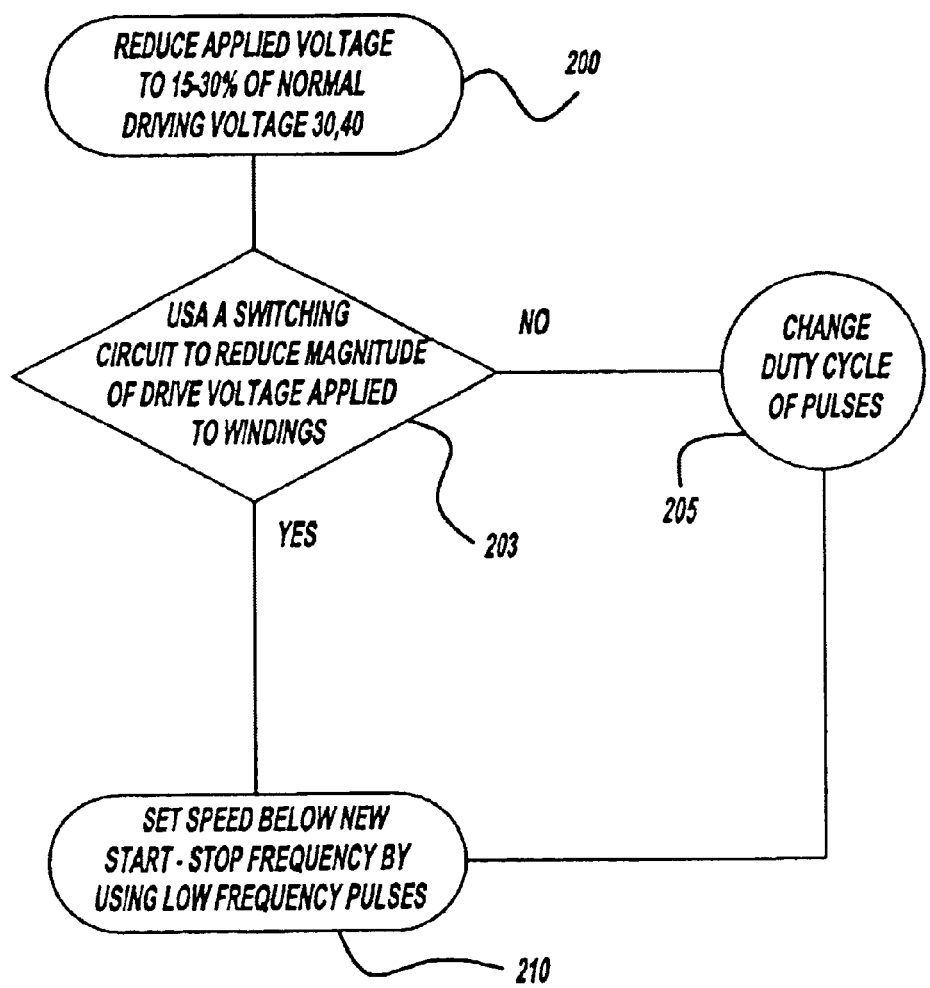
FIG. 9 is a flowchart illustrating a method of reducing bounce and noise during homing.

FIG. 9 is a flowchart illustrating a method of reducing bounce and noise during homing. To reduce the bounce of the pointer 18 and the generated noise to barely discernable levels, the applied voltage is reduced to between 15% and 30% of the normal driving voltage (approximately 1 volt for a 5 volt system) 200 (see FIG. 9). Changing the voltage (lowering it) reduces the output torque of the motor resulting in lower impact force against the stop. This results in lower noise and bounce while continuing to drive the motor into the stop.

Additionally, the speed of homing is set to a value below the new start-stop frequency of the motor 10. The start-stop frequency is the frequency at which motor 10 movement will occur from a dead stop. The start-stop frequency of a motor depends on the motor torque and the size of the load that it is driving. Typical start-stop frequencies are in the 200°/sec range. Using low frequency pulses whose frequency is below the start-stop frequency of the motor 10 ensures that the motor 10 steps reliably and in synchronism with the pulses 210. After zeroing, when the pulse frequency is increased, namely to values above the start-stop frequency, the drive torque decreases with the increase in the frequency. This has the desired consequence that the drive torque is relatively small when the stop is reached at the zero position of the pointer 18. Consequently, the bounce is reduced.

This method can be achieved in the following systems as follows:

TABLE 80

| Drive Method | Micro-Programmable PWM Levels | Drive IC - Fixed Discrete Voltages | Drive IC - Fixed Voltage Level PWM |
|---|---|---|---|
| Hardware | No additional hardware required. | Switching circuit to reduce the magnitude of the available drive voltage. | PWM signal to control the percent duty cycle of the driver. |
| Software | Independent PWM tables to drive the motor with normal or reduced voltage levels under specified conditions. | Control over the switching of the available drive voltage level. | Selection of normal or reduced power by applying either 100% duty cycle or a reduced level for the low voltage strategy. |

The duty cycle of the pulse is dependent on the desired output voltage as determined by FIG. 7. The duty cycle ranges from 0% or 0 volts=5 Volts* PV* sin ($\phi$) at $\phi$=0° to 100% or 5 Volts=5 Volts* PV* sin ($\phi$) at $\phi$=90°, where PV is the percent of maximum voltage to be used (100% for normal operation and 15% to 30% under low voltage operation. $\phi$ ranges from 0° to 345° in 15° increments for a total of 24 possible conditions/states.

In a preferred embodiment, the pulse width frequency is 16 KHz. The frequency of the driving signal refers to the rate of change of the duty cycle (the "step rate"). In a preferred embodiment, this is 40°/sec to 100°/sec for the pointer speed. Thus, the step frequency range is 40°/sec* 12 usteps/ 1°=480 usteps/sec to 100°/sec* 12 usteps/1°=1200 usteps/ sec.

Thus, from column one of table 80 it is seen that using micro-programmable pulse width modulation (PWM) levels involves the processor or microprocessor 65 reading stored voltage levels from a table such as table 50 stored in memory 60 which corresponds to the amount of angular displacement desired by the motor 10. These voltage levels are then applied coils 12a and 12b respectively. The controller 20 performs these operations by executing software instructions 70 stored in memory 60. The software 70 can be stored in memory 60 located in the controller 20 or in a separate logic block or logic chip. See FIG. 1. In another preferred embodiment, the software can be stored as either software or firmware in the microprocessor 65.

Figure 10:
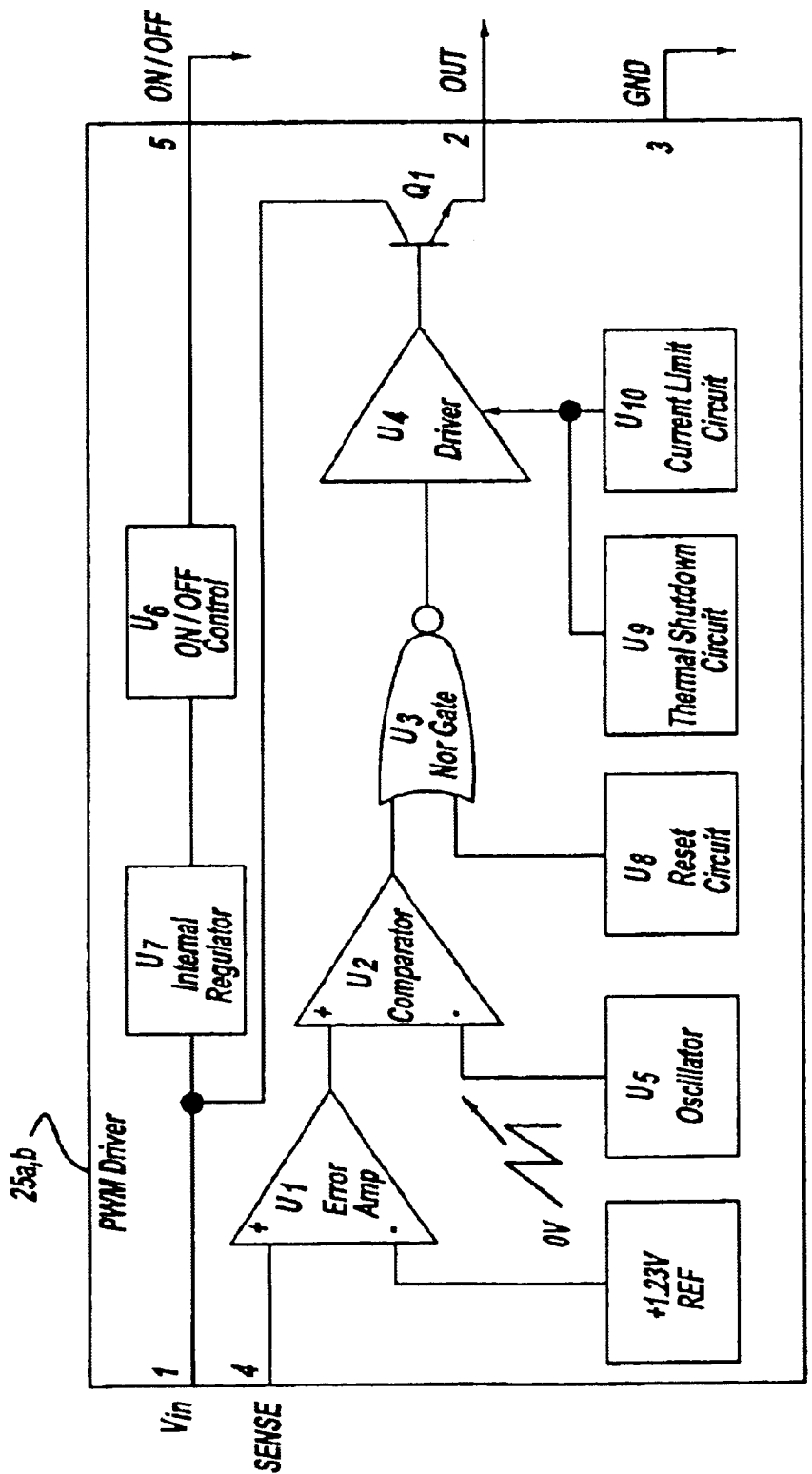
FIG. 10 is a functional block diagram of the LM2576 "Simple Switcher."

An example of a device which can be used as a pulse width modulation driver 25a, 25b is the National semiconductor LM2576 "Simple Switcher." This controller can accommodate date input voltages from 4 to 40 Volts, control load currents up to 3A and provide output voltages from 1.23 to 37 Volts. FIG. 10 is a functional block diagram of the LM2576 "Simple Switcher." The device also contains an internal switching oscillator which runs at a fixed frequency of 52 kHz, giving a period T of about 20 usec. Remote turn-on of the regulator is facilitated by a control pin.

A functional description of the LM2576 follows. It is assumed that the divided down output voltage, provided to the sense input (pin 4) of the chip, indicates that the output voltage is too high.

With a high sense input (>+1.23 Volts), the inverting input to the op amp will be less than the non-inverting input 1.23 Vref. Consequently, the voltage output of the error amp U1 will be more positive. With this positive input to the non-inverting side of the comparator U2, and the oscillator sawtooth waveform output by a 52 kHz oscillator U5, on the inverting input of U2, the comparator U2 output will spend more time in the high state.

With the input to the nor gate U3 more often high, the nor gate U3 output will spend more time low; which means the on time $t_{on}$ of Q1 will be reduced. Driver U4 is used to boost the output of U3. Because $t_{on}$ is reduced, less current will be provided to the load. As a result, a reduced output voltage will occur at pin 2, Out.

The PWM driver 25a,b also comprises an On/Off control U6 which should be grounded during normal operation, and an internal regulator U7 connected to the collector of Q1. The other input of the Nor gate U3 is connected to a reset circuit U8. A thermal shutdown circuit U9 and a current limit circuit U10 is connected to U4.

From the second column of Table 80, it is seen that using the Drive IC—Fixed Discrete Voltages methodology involves reducing the voltage levels applied to the motor 10 (200). This is achieved by using a switching circuit to reduce the magnitude of the available drive voltages applied to the windings 12a, 12b of the stepper motor 10 (203). The microprocessor 65 performs these operations by executing software instructions 70 stored in memory 60.

From the third column of Table 80, it is seen that using the Drive IC—Fixed Voltage Level PWM methodology involves reducing the voltage levels applied to the motor 10 (200). This is achieved by changing the duty cycle of the pulses applied to the windings 12a, 12b of the stepper motor 10 (205). The microprocessor 65 performs these operations by executing software instructions 70 stored in memory 60. See FIG. 1.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of driving a stepper motor, comprising the steps of:
    driving the stepper motor with an applied driving voltage using micro steps; and
    homing the stepper motor, wherein said homing the stepper motor comprises driving the stepper motor to a home position with a homing voltage, wherein said homing voltage is less than said applied driving voltage.

2. The method according to claim 1, wherein said step of driving the motor in micro steps comprises applying said applied driving voltage to at least two motor coils using a sine/cosine method, whereby maximum motor torque is produced for any given speed.

3. The method according to claim 2, wherein said applied driving voltage comprises a pulse width modulated voltage signal.

4. The method according to claim 3, wherein said step of homing comprises the step of reducing a homing voltage.

5. The method according to claim 4, wherein said step of homing further comprises the step of reducing a frequency below a start-stop frequency of the motor.

6. The method according to claim 5, wherein said step of reducing frequency comprises sending step pulses at a frequency below a start-stop frequency of the motor, whereby noise and bounce is reduced during homing; and
    wherein said step of reducing said homing voltage comprises changing a duty cycle of said homing voltage.

7. The method according to claim 3, wherein said step of homing comprises the step of reducing a frequency below a start-stop frequency of the motor.

8. The method according to claim 1, wherein said step of homing comprises the step of reducing said homing voltage.

9. The method according to claim 3, further comprising reducing the homing voltage by changing a duty cycle of said homing voltage.

10. The method according to claim 8, wherein said step of homing further comprises the step of reducing a frequency of said motor below a start-stop frequency of the motor during homing of the motor.

11. The method according to claim 10, wherein said step of reducing frequency comprises sending step pulses at a frequency below a start-stop frequency of the motor, whereby noise and bounce is reduced during homing; and
    wherein said step of reducing said homing voltage comprises changing a duty cycle of said homing voltage.

12. A The method according to claim 1, wherein said step of homing comprises the step of reducing a frequency of said motor below a start-stop frequency of the motor.

13. The method according to claim 12, wherein said step of reducing frequency comprises sending step pulses at a frequency below a start-stop frequency of the motor, whereby noise and bounce is reduced during homing.

14. The A method of driving a stepper motor, comprising the steps of:
    driving the stepper motor using micro steps; and
    homing the stepper motor, wherein said step of homing comprises the step of reducing an applied voltage between 15% and 30%.

15. A stepper motor, comprising:
    a plurality of windings; and
    a controller comprising a plurality of outputs operably attached to said windings, wherein said controller comprises:
        a processor;
        at least one pulse width modulation driver operably connected to said processor; and
        memory comprising software operably connected to said processor, wherein said software comprises the following instructions:
    drive said stepper motor with an applied driving voltage; and
    drive said stepper motor to a home position with a homing voltage, wherein said homing voltage is less than said applied driving voltage.

16. The stepper motor according to claim 15, further comprising:
    a table stored in said memory, whereby said table comprises driving signals which are 90° out of phase with each other corresponding to states also stored in said table.

17. The stepper motor according to claim 16, wherein said software comprises the following instructions:
    reading a state from said table;
    driving a first of said plurality of coils with a voltage proportional to a cosine of said state multipled by said applied driving voltage; and
    driving a second of said plurality of coils with a voltage proportional to a sine of said state multipled by said applied driving voltage.

18. The stepper motor according to claim 17, wherein said software further comprises the following instructions:
    homing said stepper motor by reducing said homing voltage; and reducing a frequency of said motor below a start-stop frequency of said motor, whereby noise and bounce is reduced during homing.

19. The stepper motor according to claim 15, wherein said software further comprises the following instructions:
    homing said stepper motor by reducing said homing voltage and reducing a frequency of said motor below a start-stop frequency of said motor.

20. The stepper motor according to claim 19, wherein said software further comprises the following instructions:
    homing said stepper motor by reducing said homing voltage by changing a duty cycle of said homing voltage; and
    reducing a frequency of said motor below a start-stop frequency of said motor by sending pulses at a frequency below a start-stop frequency of said motor.

21. A stepper motor, comprising:
    a plurality of windings; and
    a controller comprising a plurality of outputs operably attached to said windings, wherein said controller comprises:

a processor;

at least one pulse width modulation driver operably connected to said processor; and memory comprising software operably connected to said processor, wherein said software comprises the following instructions:

drive said stepper motor with an applied driving voltage; and drive said stepper motor to a home position by reducing a frequency of said motor below a start-stop frequency of said motor.

22. A stepper motor, comprising:

a plurality of windings; and a controller comprising a plurality of outputs operably attached to said windings, wherein said controller comprises:

a processor;

at least one pulse width modulation driver operably connected to said processor; and memory comprising software operably connected to said processor, wherein said software comprises the following instructions:

drive said stepper motor with an applied driving voltage; and drive said stepper motor to a home position with a homing voltage, wherein said homing voltage is determined by changing a duty cycle of said applied driving voltage.

* * * * *

UNITED STATES PATENT AND TRADEMARK OFFICE
CERTIFICATE OF CORRECTION

PATENT NO. : 6,853,162 B2 Page 1 of 1
DATED : February 8, 2005
INVENTOR(S) : Stephen L. Betts et al.

It is certified that error appears in the above-identified patent and that said Letters Patent is hereby corrected as shown below:

Column 6,
Line 43, "an" should be -- can --.

Column 8,
Line 29, after "accommodate" delete "date".

Column 9,
Line 50, "3" should be -- 8 --.
Line 63, before "The" delete "A".

Column 10,
Line 3, before "A" (first occurrence) delete "The".

Signed and Sealed this

Tenth Day of May, 2005

JON W. DUDAS
*Director of the United States Patent and Trademark Office*